Patented Dec. 13, 1938

2,140,318

UNITED STATES PATENT OFFICE 2,140,318

2,2' - DIMETHYL - 4,4' - DIHYDROXY - PARA-PHENANTHROLIN AND MANUFACTURE THEREOF

Hans Henecka, Wuppertal-Elberfeld, Germany, assignor to Winthrop Chemical Company, Inc., New York, N. Y., a corporation of New York No Drawing. Application June 25, 1937, Serial No. 150,333. In Germany July 8, 1936

5 Claims. (Cl. 260—40)

This invention relates to 2,2'-dimethyl-4,4'-dihydroxy-para-phenanthrolin and to the manufacture thereof.

In "Journal of the Chemical Society" (London) 1935, page 1568, various arylamino-crotonic acid esters, among others the para-phenylene-bis-$\beta$-amino-crotonic acid ester are described which are obtained by condensation of aromatic diamines with acetic acid ester. According to the statement in the last paragraph of the above mentioned page none of the crotonic acid esters described could be transformed into a quinoline derivative.

In accordance with the present invention it is possible to condense the para-phenylene-bis-$\beta$-amino-crotonic acid ester to 2,2'-dimethyl-4,4'-dihydroxy-para-phenanthrolin by heating the para-phenylen-bis-$\beta$-amino-crotonic acid ester to higher temperatures, say from about 200 to 300° C., preferably at about 250 to about 275° C. The reaction is advantageously carried out in a diluent which is inert to the starting material, such as paraffin oil, 1,4-dichloronaphthalene, acenaphthene, dibenzylether, ethyl-benzylether, benzophenone, $\alpha$- and $\beta$-benzylnaphthalene, 9-alkylanthracene, glycerol, phthalic acid ester etc.

The new product is intended to be used as initial material for chemical syntheses, for instance, in the manufacture of therapeutically useful products (compare copending application for Letters Patent Ser. No. 150,331, filed June 25, 1937).

The invention is further illustrated by the following example without being restricted thereto.

Example.—150 grams of 1.4-phenylen-bis-$\beta$-amino-crotonic acid ethyl ester (melting at 134° C.) are introduced rapidly into 750 ccs. of paraffin oil which has been heated to 270° C. and heated for further 3 to 5 minutes. With the splitting off of alcohol a granular yellow brown powder separates which is filtered with suction after cooling and washed first with ligroin and then with petroleum ether. By boiling with about 400 ccs. of alcohol the 2,2'-dimethyl-4,4'-dihydroxy-para-phenanthrolin is obtained as an almost colorless, thin crystalline powder which is not yet melted at 280° C. The substance is readily soluble in dilute caustic soda solution.

As diluent other high boiling substances may be used instead of paraffin oil, for instance, 1,4-dichloronaphthalene.

I claim:

1. The process which comprises heating para-phenylene-bis-$\beta$-aminocrotonic acid ester in the presence of a diluent which is inert to the starting material to a temperature from about 200° to about 300° C.

2. The process which comprises heating para-phenylene-bis-$\beta$-aminocrotonic acid ester in the presence of a diluent which is inert to the starting material to a temperature from about 250° to about 275° C.

3. The process which comprises heating para-phenylene-bis-$\beta$-aminocrotonic acid ester in the presence of paraffin oil to a temperature from about 200° to about 300° C.

4. The process which comprises heating para-phenylene-bis-$\beta$-aminocrotonic acid ester in the presence of paraffin oil to a temperature from about 250° to about 275° C.

5. 2,2'-Dimethyl-4,4'-dihydroxy - para - phenanthrolin, which forms a crystalline white powder.

HANS HENECKA.